United States Patent [19]
Hatton et al.

[11] Patent Number: 5,307,194
[45] Date of Patent: Apr. 26, 1994

[54] COVERT COMMUNICATION SYSTEM USING ULTRAVIOLET LIGHT

[75] Inventors: James J. Hatton, Miller Pl.; Saulius Janusas, Seacliff, both of N.Y.

[73] Assignee: Grumman Aerospace Corporation, Bethpage, N.Y.

[21] Appl. No.: 856,693

[22] Filed: Mar. 24, 1992

[51] Int. Cl.$^5$ ............................................. H04B 10/00
[52] U.S. Cl. .................................... 359/154; 359/150; 359/162; 359/182; 250/504 R
[58] Field of Search ............... 359/143, 150, 152, 154, 359/162, 169–170, 172, 177, 182, 193, 257; 250/504 R

[56] References Cited

U.S. PATENT DOCUMENTS

| | | | |
|---|---|---|---|
| 2,858,421 | 10/1958 | Touvet | 359/162 |
| 3,050,630 | 8/1962 | Bird | 359/162 |
| 3,129,332 | 4/1964 | Leen | 250/83.3 |
| 3,657,543 | 4/1972 | Rose | 250/199 |
| 4,079,246 | 3/1978 | Misek | 250/199 |
| 4,383,200 | 5/1983 | Van Zon et al. | 315/57 |
| 4,493,114 | 1/1985 | Geller et al. | 359/172 |
| 4,703,474 | 10/1987 | Foschini et al. | 370/18 |
| 4,829,597 | 5/1989 | Gelbwachs | 359/172 |
| 5,062,154 | 10/1991 | Geller et al. | 359/154 |
| 5,191,460 | 3/1993 | Lapatovich | 359/154 |

FOREIGN PATENT DOCUMENTS 0282399 9/1988 European Pat. Off. ............. 359/169

Primary Examiner—Richard E. Chilcot, Jr.
Assistant Examiner—K. Negash
Attorney, Agent, or Firm—Bacon & Thomas

[57] ABSTRACT

A covert communication system uses ultraviolet light rather than radio waves as a medium for communication. Suitable wavelengths are chosen by examining atmospheric penetration, attenuation by clouds, presence of interfering sources, and ease of generation and detection. The transmitted ultraviolet light may contain both voice information and other data, impressed upon the light by frequency or pulse modulation using a Pockels cell light modulator. A corresponding receiver can be arranged as a transponder to determine range by phase angle differences between transmitted and reflected waveforms. By using an appropriate lens, the receiver can also determine the angle of incidence of a detected ultraviolet signal, and therefore the bearing of the transmitter.

17 Claims, 5 Drawing Sheets

COVERT COMMUNICATION SYSTEM USING ULTRAVIOLET LIGHT

BACKGROUND OF THE INVENTION

1. Field of the Invention

This invention relates to a communication system, and in particular to a covert communication system capable of two way covert voice and data communication undetectable by radio frequency band electronic surveillance equipment. The invention also relates to a system for covert approach guidance, including voice and data communication, during aircraft refueling and instrument landing operations, and to a covert means of ground to ground and ground to air communications.

2. Description of Related Art

The ever-increasing sophistication of modern electronic surveillance equipment has made it difficult to hide radio emissions emanating from communications equipment. Spread spectrum and special modulation or encryption techniques can be used to deny unauthorized listeners the information content of the transmissions, but do not prevent detection of the existence of the transmissions. Covert millimeter wave transceivers capitalize on the absorptive properties of the atmosphere to limit the range at which detection can occur, but still use the radio frequency spectrum and are therefore still subject to intercept by modern high gain extended frequency range electronic surveillance sets.

In order to avoid the above problems, it has previously been proposed to use light as a medium for covert communications. An early attempt to provide a covert communication system using light as the medium of transmission was disclosed in U.S. Pat. No. 2,858,421. The system of U.S. Pat. No. 2,858,421 used a rare gas electrical discharge tube with radio frequency or pulse excitation of the gas, the excitation signal being modulated by conventional AM, FM, or other modulation techniques, Although infrared radiation was preferred, the system was also described as being adaptable for use in the ultraviolet region of the electromagnetic spectrum, by providing a mercury vapor lamp UV source. However, difficulties in implementation, in particular in connection with providing for the necessary high frequency on and off switching of the source tube, prevented this type of system from attaining widespread usage.

Nevertheless, despite such problems, light wave communication systems have continued to be proposed, for example in U.S. Pat. No. 3,657,543 (modulated excitation of an optically emissive diode, especially in the near-infrared region), U.S. Pat. No. 4,079,246 (line of sight communication and reception of scattered light using a high powered laser source), and U.S. Pat. No. 4,493,114 (UV communication in the "solar blind" spectrum, from 0.23 to 0.28 micrometers, using a pulse controlled mercury argon source). Each of these systems suffers either from the above-mentioned implementation problems or from the drawback that the output power of ultraviolet laser sources are currently too low for practical line of sight communication, and therefore none has achieved widespread usage.

Of course, numerous light communication systems are also known in the context of fiber optic cable communications (see e.g., U.S. Pat. No. 4,703,474), but such systems cannot be used in applications such as air-to-air communications. Despite the above proposals, therefore, a need still exists for a practical line of sight communication system using light, and in particular ultraviolet light, as the medium of transmission.

SUMMARY OF THE INVENTION

It is an objective of the invention to provide an improved communication system in which communications are made undetectable by radio frequency band electronic surveillance equipment because ultraviolet light is used as the medium of communication, and yet which avoids the drawbacks of the prior art by providing a constant output high power source which does not require high frequency switching in order to achieve a suitably modulated output.

It is a second objective of the invention to provide an improved communication system which permits two-way covert voice and data communication, multi-channel operation, and which permits spread spectrum modulation and packetizing of voice and digital data without using the radio spectrum as a medium of transmission.

It is a third objective of the invention to provide an improved ultraviolet communication system which permits two-way covert voice and data communication, multi-channel operation, and which permits spread spectrum modulation and packetizing of voice and digital data.

It is a fourth objective of the invention to provide an improved ultraviolet light communication system which, in addition to providing voice and digital data communication capability, provides range and bearing information.

It is a fifth objective of the invention to provide a system for providing covert in-flight refueling or instrument landing operations using equipment similar in operation and maintenance to standard avionics equipment and yet in which communications are undetectable by current electronic surveillance equipment and which avoids the radio frequency spectrum.

These objectives are accomplished by providing a covert communication system which uses invisible light instead of radio waves as the medium for communication. In particular, use is made of ultraviolet light having wavelengths of at least 0.2 micrometers, and preferably more than 0.3 micrometers. By appropriate choice of wavelengths, the communication system of the invention is capable of providing radio silent communications over a range of several kilometers. In particular applications of the invention, by using special modulation and processing techniques, other vital information such as precise range between stations, range rate and relative angle can be provided by the system.

The system is especially suitable for use in covert in-flight refueling operations and covert instrument landing systems, although the principles of the invention may be used in a variety of different applications, with or without the added ranging and directional capabilities of the system.

DETAILED DESCRIPTION OF THE PREFERRED EMBODIMENTS

Figure 1:
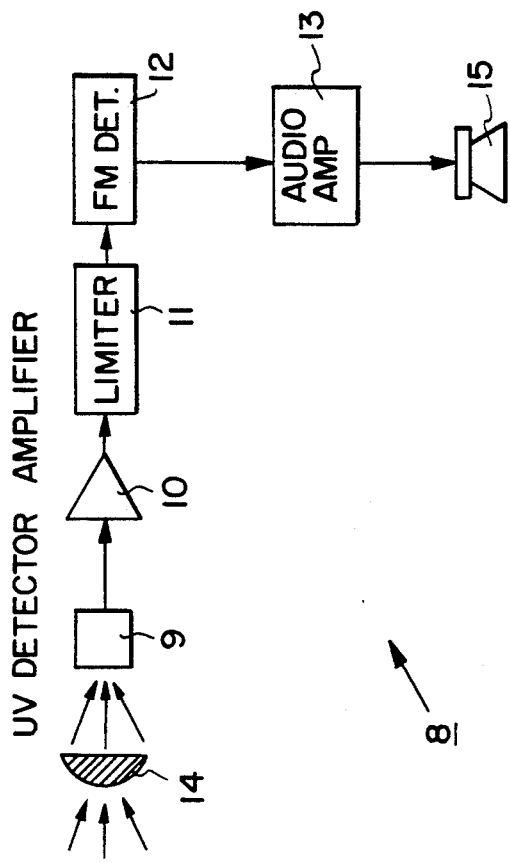
FIG. 1 is a schematic block diagram illustrating a transmitter and receiver for a one-way communications link constructed in accordance with the principles of a preferred embodiment of the invention.
Figure 1:
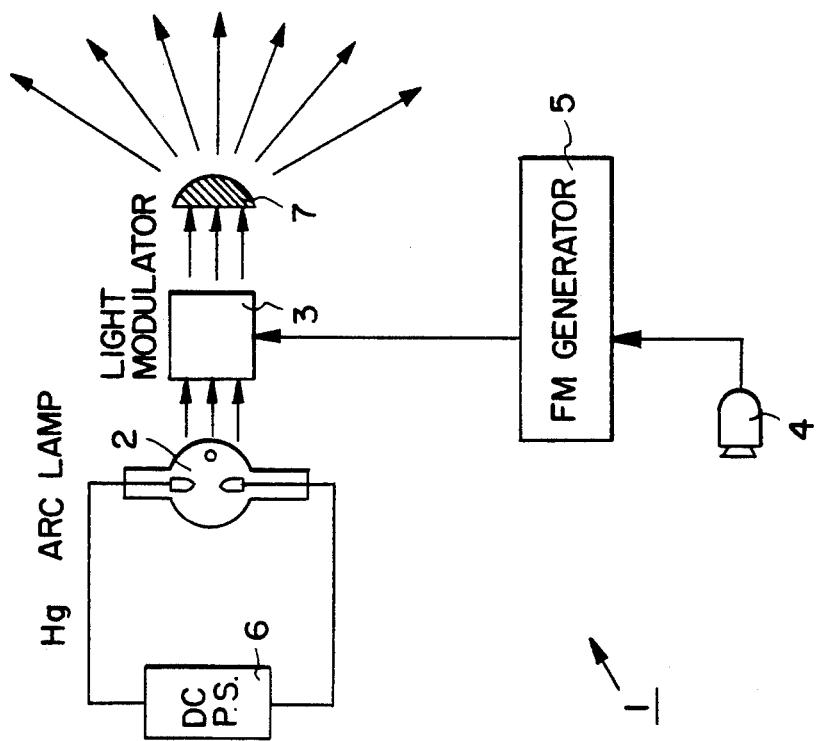

FIG. 1 shows a transmitter and receiver for establishing an ultraviolet communications link in accordance with a preferred embodiment of the invention.

Transmitter 1 includes a UV source 2 selected to provide a wavelength of desired atmospheric penetration. The UV source 2, illustrated as a mercury arc lamp, emits a line spectrum of UV and visible light. The visible light is filtered out leaving only the UV light. The UV light is then passed through a light modulator 3. The modulated UV light exits the light modulator and is transmitted out to space through a lens 7 for a desired spatial coverage. Light modulator 3 modulates the UV light with a bias carrier frequency. Intelligence is impressed on the bias carrier frequency in the form of frequency or pulse modulation. In the illustrated embodiment, intelligence is provided by a microphone 4 and an FM generator 5. Power for the UV source 2 is provided by a DC power supply 6.

Use of frequency or pulse modulation is preferred because it greatly reduces interference from ambient UV sources such as the sun, jet exhaust, lightning, and so forth, since such interference is amplitude modulated rather than frequency modulated. Such a system can operate in a heavy interference environment.

In order for reliable communications to occur over a few kilometers, the transmitter must generate at least 5 to 10 Watts of UV power. To achieve this, a mercury short arc lamp is preferred. The arc lamp has several strong and narrow spectral lines, any one of which can be used for purposes of the invention. Simultaneous use of the spectral lines offers multiple channel capability. Optical filters are available to select any spectral line desired. One suitable mercury short arc lamp is made by Advanced Radiation Corporation and is sold as Model HSA-200. It is powered by a 200 Watt rated DC power source.

The preferred light modulator 3 is a Pockels cell light modulator. The Pockels cell light modulator is an electronically driven optical modulator. Its switchable transmissivity is achieved with special crystals that change their optical characteristics with applied voltage across them. A suitable Pockels cell is made by Lasermetrics and sold under the trade name "Group 1000 Micro-optic Light Modulators." Required modulation voltages for this type of modulator are on the order of 1.5 kilovolts. Because the crystals are insulators, only capacitive currents are drawn from the high voltage electronics.

The line of sight receiver 8 in its simplest form is basically a large bandwidth UV photodetector 9 followed by an FM demodulator 10, limiter 1 1, FM detector 12, and an audio amplifier 13. An objective lens 14 intercepts the UV signal and concentrates it on a silicon UV detector 9. The detector 9 converts the UV signal into a frequency modulated AC signal. The signal is then amplified by an amplifier 10 and passed through a limiter 11 to remove all amplitude induced interference. The limited signal is then applied to the FM detector 12 where the audio signal is recovered for playback through a speaker 15. By combining receiver 8 with transmitter 1, a transceiver may be formed.

Specially designed lenses are needed for both the transmitter and the receiver. For the transmitter, lens 7 preferably should project uniform illumination over a controlled spatial angle of about 90°. An approximately 6" F1 meniscus lens is needed because the preferred UV lamp arc is about $\frac{1}{4}$" in diameter, inherently making the uniformity of distribution simpler. Considerable spherical and chromatic aberration in the transmitting lens is tolerable, however.

Figure 3:
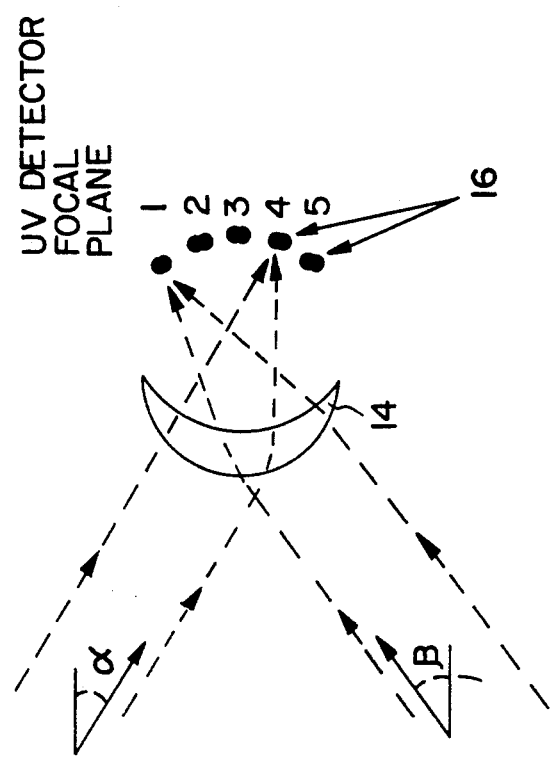
FIG. 3 is a schematic diagram of a preferred embodiment of the invention capable of direction finding.

For receiving, on the other hand, the lens must be considerably more accurate since it has to collect all of the intercepted UV light over as wide an angle as possible and form a point image on the detector, which is preferably in the form of an array of detector elements 16, as shown in FIG. 3. Image imperfections would cause spreading of the light on adjacent detectors, thus reducing the system sensitivity and angular resolution. A variety of lenses, including compound lenses are suitable. The image of the lens should form a flat plane rather than a curved surface, since a flat detector array is much simpler than a curved one.

Figure 4A:
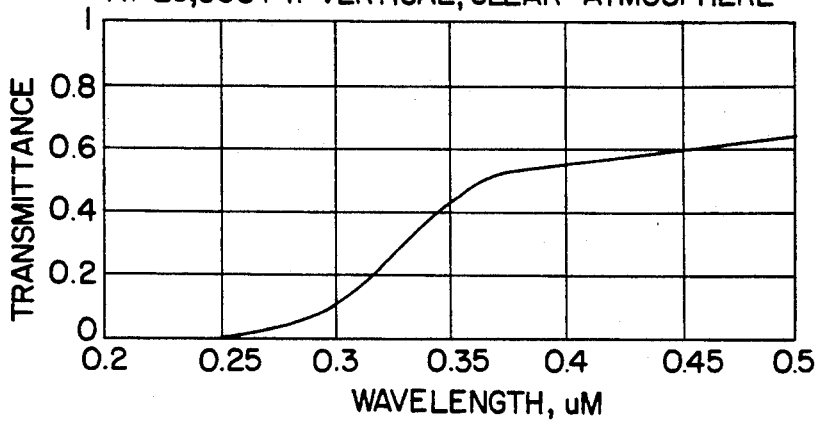
FIGS. 4a–4c are graphs showing the transmittance of ultraviolet light through the atmosphere under various conditions.
Figure 4B:
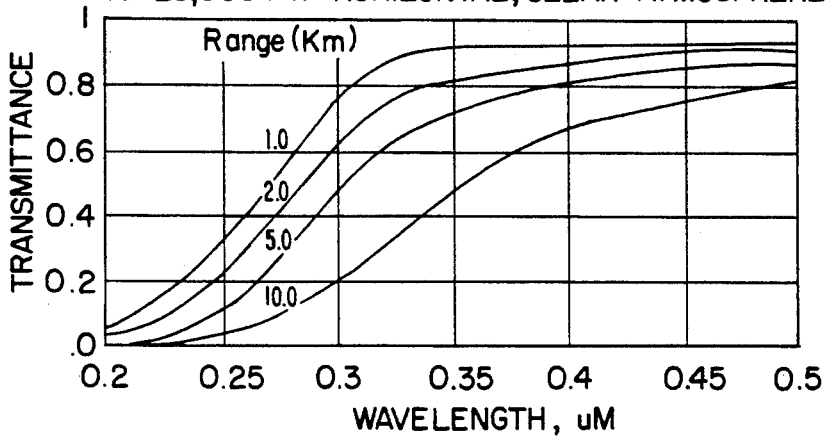
Figure 4C:
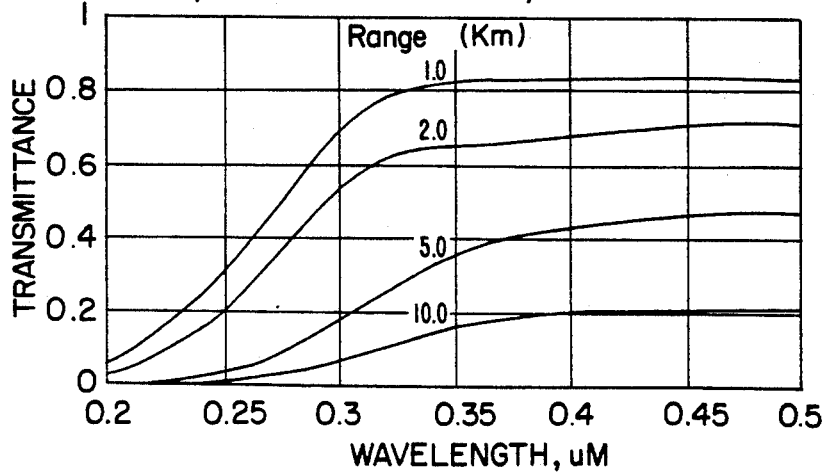

The preferred wavelengths of UV light used by the system are determined by the transmittance of UV light through the atmosphere, illustrated in FIGS. 4a–4c. Clear air offers the least attenuation while cumulus clouds, laden with moisture, offer the most attenuation. Altitude also plays a part in attenuation since the density of absorbants, mainly moisture, varies directly with atmospheric pressure. At very high altitudes, for example in the ionosphere, ozone absorption of UV light becomes a factor. Obscuration in clear atmosphere or through clouds is small enough to allow for practical, covert communication in the 0.3–0.5 micrometer band.

For typical aircraft operations within the flight regime of the atmosphere, the UV transmittance is well behaved. FIG. 4a illustrates the vertical UV transmittance of the standard US atmosphere, free of clouds and other obscurants. As shown in FIG. 4a, at 20,000 feet, the atmosphere is relatively transparent to UV.

FIG. 4b shows the transmittance in clear air in the horizontal direction with range in kilometers as a variable parameter. This graph shows that attenuation is acceptable (about a 3 decibel loss) at wavelengths greater than 0.3 micrometers. Finally, FIG. 4c shows the horizontal transmittance of an atmosphere with cirrus (ice) clouds. The transmittance of 0.3 to 0.5 micrometer light at ranges of 1 or 2 kilometers in cirrus clouds is still acceptable.

Figure 2:
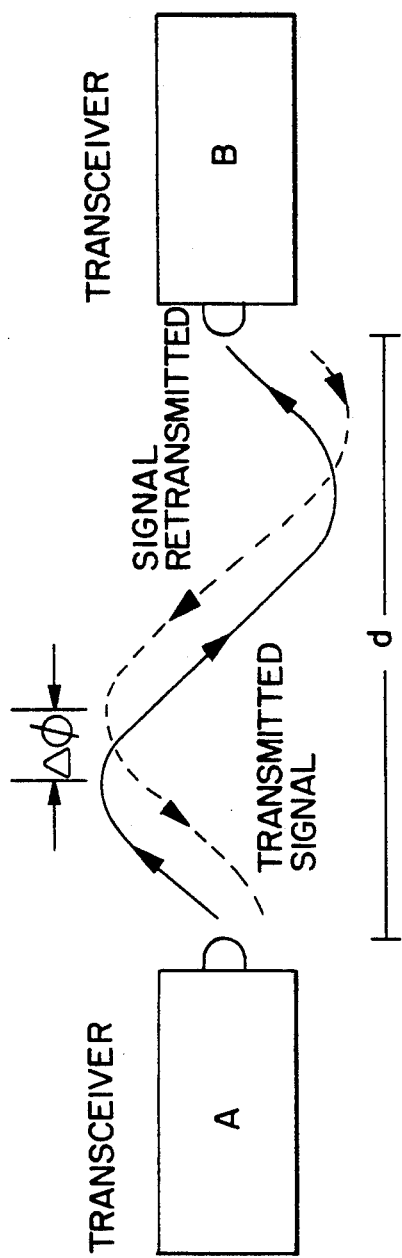
FIG. 2 is a schematic block diagram of a preferred embodiment of the invention which permits ranging.

By operating the preferred transmitter and receiver as UV transceivers in full duplex mode, and using special modulation and processing techniques, it is possible according to a variation of the preferred embodiment to obtain accurate range between the transceivers. FIG. 2 illustrates the principles which permit such ranging. Transceiver A, the interrogator, transmits a sinusoidal frequency modulated UV signal with a wavelength of approximately 1 mile. Transceiver B, acting as a transponder, receives the signal and immediately retransmits it back to transceiver A. Transceiver A then measures the phase angle between the transmitted waveform and the received waveform using phase detectors. The phase angle difference $\Delta \phi$ with system delays accounted for corresponds to a difference in range d. For example, for a wavelength of one mile, a phase shift of 30° corresponds to the range of (1 mile/360°)×(30°/2)=1/24 miles, or 220 feet. Since this method of ranging is ambiguous for ranges greater than one wavelength, different wavelengths are used to resolve the ambiguity for longer range operations.

If an acceptable signal-to-noise ratio can be maintained, the phase angle measurements utilized by this embodiment of the invention will be very accurate, and ranges between transceivers can be obtained with a precision of a few feet. Furthermore, the range rate (speed) is easily extracted, using differentiation, by the processor by tracking the range in time. By switching the role of the transceivers, the interrogator becomes the transponder and vice versa and thus the range can also be measured at transceiver B. Switching of roles can easily be made fully automatic under processor control.

The ranging function waveform can be integrated into the voice channel waveform. It can also be multiplexed without interfering with the voice communication. A one millisecond burst of ranging waveform, every second, will enable the system to make over 100 range measurements during a typical communication, which is sufficient to obtain good range data.

As illustrated in FIG. 3, the preferred system's receiving optics are similar to a conventional CCD television camera using a wide angle lens. The lens is designed to focus UV images on an array of UV detectors similar to an insect's compound eye, thus permitting use of the system for obtaining bearing information.

The UV image of a transmitting transceiver is captured as a point on the focal plane array of UV detectors. Only one detector is activated by any one transmitter. UV emanations from UV transceivers arriving at the lens from different directions activate correspondingly different detectors. Therefore, the angle, e.g., $\alpha$ or $\beta$, is determined by knowing the position of the activated UV detectors in the array. For a 90° field of view, a 30×30 array would be able to determine the angle to about 3°. Integration and tracking by the processor can be used by this method to improve accuracy several fold.

Preferably, each element of the array includes a microchip amplifier or, alternatively, may be sequentially sampled in a raster or spiral format as is done in television cameras.

Figure 5:
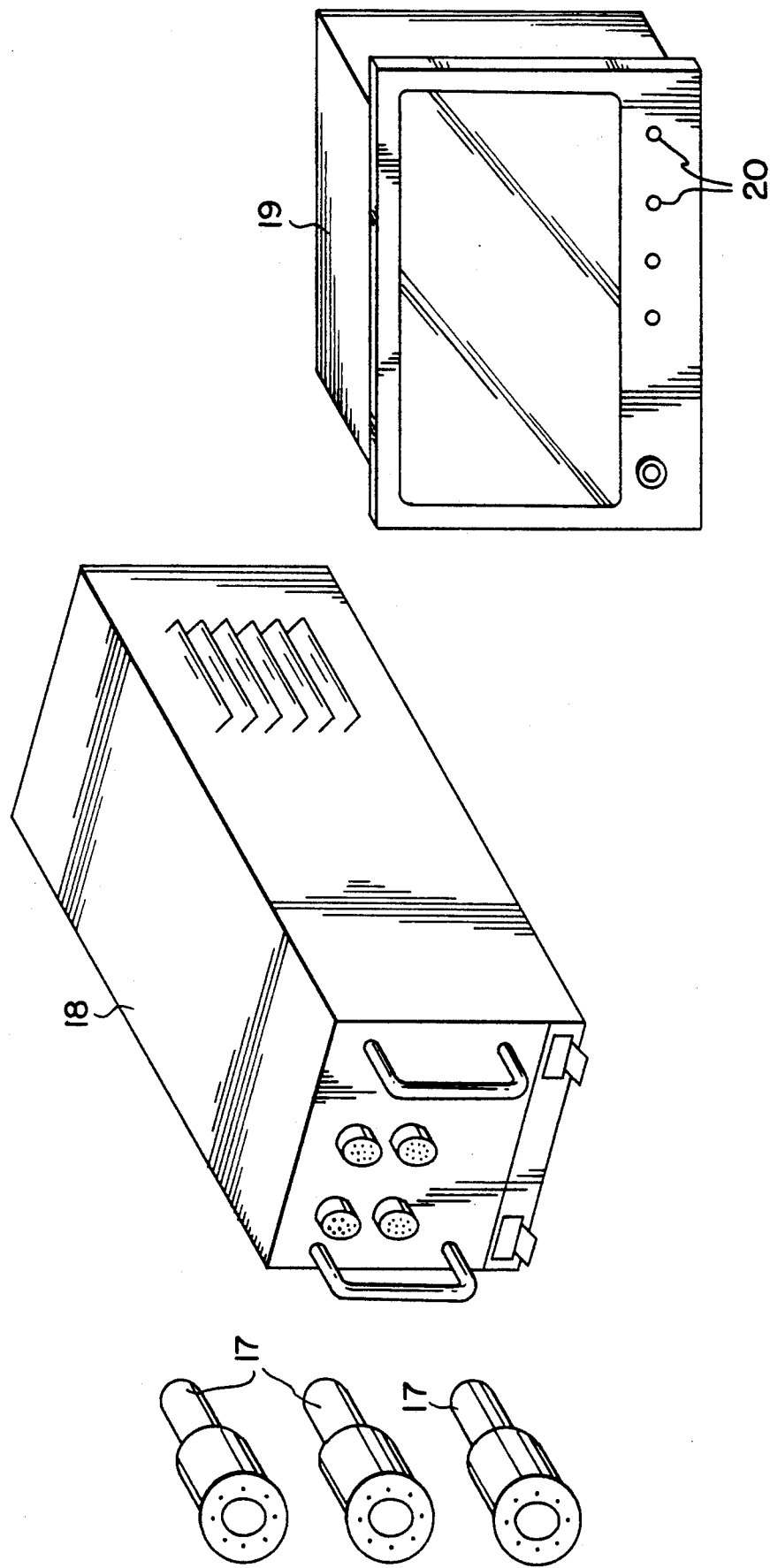
FIG. 5 is a perspective view of a preferred embodiment of the invention suitable for use in a covert aircraft approach guidance or landing system.

As shown in FIG. 5, a practical embodiment of the invention includes several UV transceiver modules 17, a central electronics unit 1 8, and a control and display unit 19. The central electronics unit 18 contains all of the electronics necessary to generate the waveforms and control the functions of the system. As needed, the processor can perform acquisition, ranging, direction finding and data processing functions. The central electronics unit 18 also supplies power to the transceiver modules 17 and the control and display unit 19.

Control and display unit 19 can be equipped to display both range and bearing information as explained above. Components of the system are preferably interconnected by multiconductor cables (not shown), and the system includes audio outputs 20 interfaced to a standard audio bus system in a manner similar to that of other military VHF or UHF radio systems, using a standard microphone and headset or speakers (not shown). The UV transmit/receive modules 17 are mounted in the skin of the aircraft at locations selected to obtain the desired spatial coverage. Modules 17 contain the transmitting/modulating and receiving front end components illustrated in FIGS. 1-3.

Figure 6:
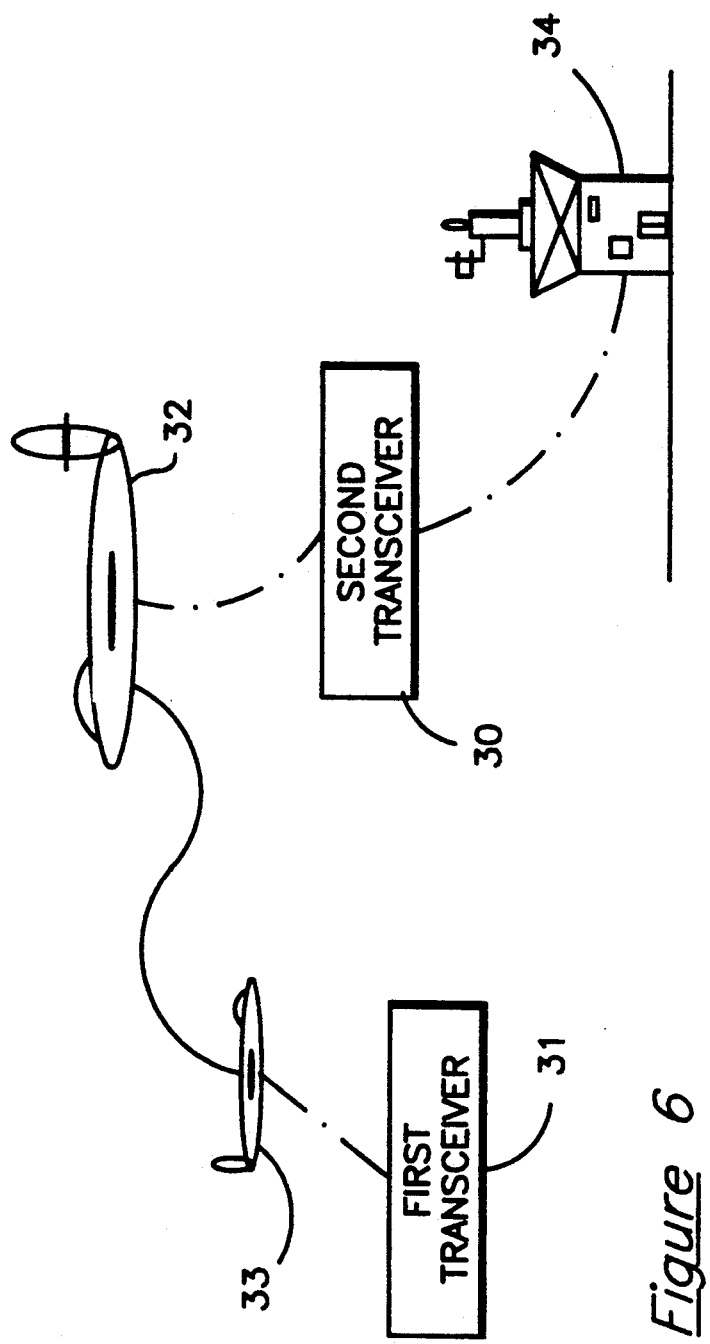
FIG. 6 is a schematic drawing showing various applications of the preferred system.

According to a preferred implementation of the invention, as illustrated in FIG. 6, a pair of transceivers 30 and 31 constructed in accordance with the above principles may be respectively installed on board a refueling tanker 32 and on the aircraft 33 to be refueled, permitting approach guidance and covert voice and data communication during refueling operations. Upon energizing the respective ultraviolet optical transceivers of each aircraft at the refueling way point, the system proceeds with automatic acquisition of the UV communication link. "Link up" is displayed by a visual indicator located on the central display unit, which also displays range, elevation, rates in feet per second, and bearing as a guide for the pilot during approach to the tanker.

FIG. 6 also indicates that transceiver 30 could be situated at a landing strip 34, either on a ship or on land. For example, the range, rate, and bearing information provided by the preferred system could be made available to a ship's flight director to allow an instrument approach. Similar paired configurations of transceivers could also assist helicopters or fixed wing aircraft during nighttime, unlighted, covert operations at hidden airfields where radio silence must be maintained during the approach and landing.

Having thus described specific preferred embodiments of the invention, it is nevertheless intended that the invention not be limited to any of the preferred embodiments described above, but rather that it include all variations and modifications which do not fall within the scope of the prior art. Consequently, it is intended that the invention be defined solely by the appended claims.

We claim:

1. A communication system, comprising:
   UV source means for generating ultraviolet light;
   light modulation means for modulating the ultraviolet light generated by said UV source means in order to impress intelligible information on said ultraviolet light;
   lens means for transmitting modulated ultraviolet light into space;
   line of sight receiving means for detecting transmitted ultraviolet light and for converting detected ultraviolet light into an electrical signal;
   demodulator means for demodulating said electrical signal to extract said intelligible information from said signal.

2. A system as claimed in claim 1, wherein said UV source means is a mercury arc lamp.

3. A system as claimed in claim 1, wherein said light modulation means is a Pockels cell light modulator.

4. A system as claimed in claim 3, further comprising means for converting intelligible information into an electrical signal, means for modulating said electronic signal with a carrier frequency, and means for applying said modulated electrical signal to said light modulation means to impress said intelligible information on said ultraviolet light.

5. A system as claimed in claim 4, wherein said means for modulating said electronic signal is a frequency modulator.

6. A system as claimed in claim 5, wherein said means for converting intelligible information is a microphone.

7. A system as claimed in claim 1, further comprising means for converting intelligible information into an electrical signal, means for modulating said electronic signal with a carrier frequency, and means for applying said modulated electrical signal to said light modulation means to impress said intelligible information on said ultraviolet light.

8. A system as claimed in claim 7, wherein said means for modulating said electronic signal is a frequency modulator.

9. A system as claimed in claim 8, wherein said means for converting intelligible information is a microphone.

10. A system as claimed in claim 1, wherein said ultraviolet light has a wavelength of between approximately 0.3 and 0.5 micrometers, inclusive.

11. A system as claimed in claim 1, wherein said line of sight receiving means includes a lens and an ultraviolet detector element, and said demodulator means includes an FM detector.

12. A system as claimed in claim 11, further including an amplifier electrically connected to the UV detector, a limiter electrically connected between the amplifier and the FM detector, and an audio amplifier electrically connected between the FM detector and a speaker.

13. A system as claimed in claim 1, further comprising means for immediately retransmitting a UV signal detected by said receiving means to a first UV transceiver, said first transceiver comprising said UV source means, light modulation means, and lens means, and wherein said first transceiver further comprises means for measuring a phase angle between a UV signal transmitted by said transceiver and the UV signal retransmitted by said retransmitting means, said retransmitting means and receiving means together forming a second transceiver, the phase angle difference corresponding to a range between said receiving means and said transceiver.

14. A system as claimed in claim 1, wherein said receiving means comprises a plurality of UV detectors positioned in an array, means including a lens for focusing incident ultraviolet light on one of said UV detectors, and means for determining an angle of incidence of ultraviolet light on said lens by determining which of said UV detectors is the UV detector on which the incident light is focused.

15. A system as claimed in claim 1, comprising a first transceiver carried by an aircraft, and a second transceiver mounted separately from said aircraft, each said transceiver including at least one each of said UV source means, light modulation means, lens means, line of sight receiving means, and demodulator means, and further including display means electrically connected to said receiving means for visually displaying range, rate, and bearing information, and audio reproduction means electrically connected to said demodulator means for reproducing sound carried by said transmitted ultraviolet light.

16. A system as claimed in claim 15, wherein said second transceiver is carried by a refueling tanker.

17. A system as claimed in claim 15, wherein said second transceiver is located at an aircraft landing site.

* * * * *